May 1, 1951 A. L. JEFFUS 2,551,437
TIE ROD CONNECTION FOR VEHICLE STEERING MECHANISMS
Filed June 8, 1948 2 Sheets-Sheet 1
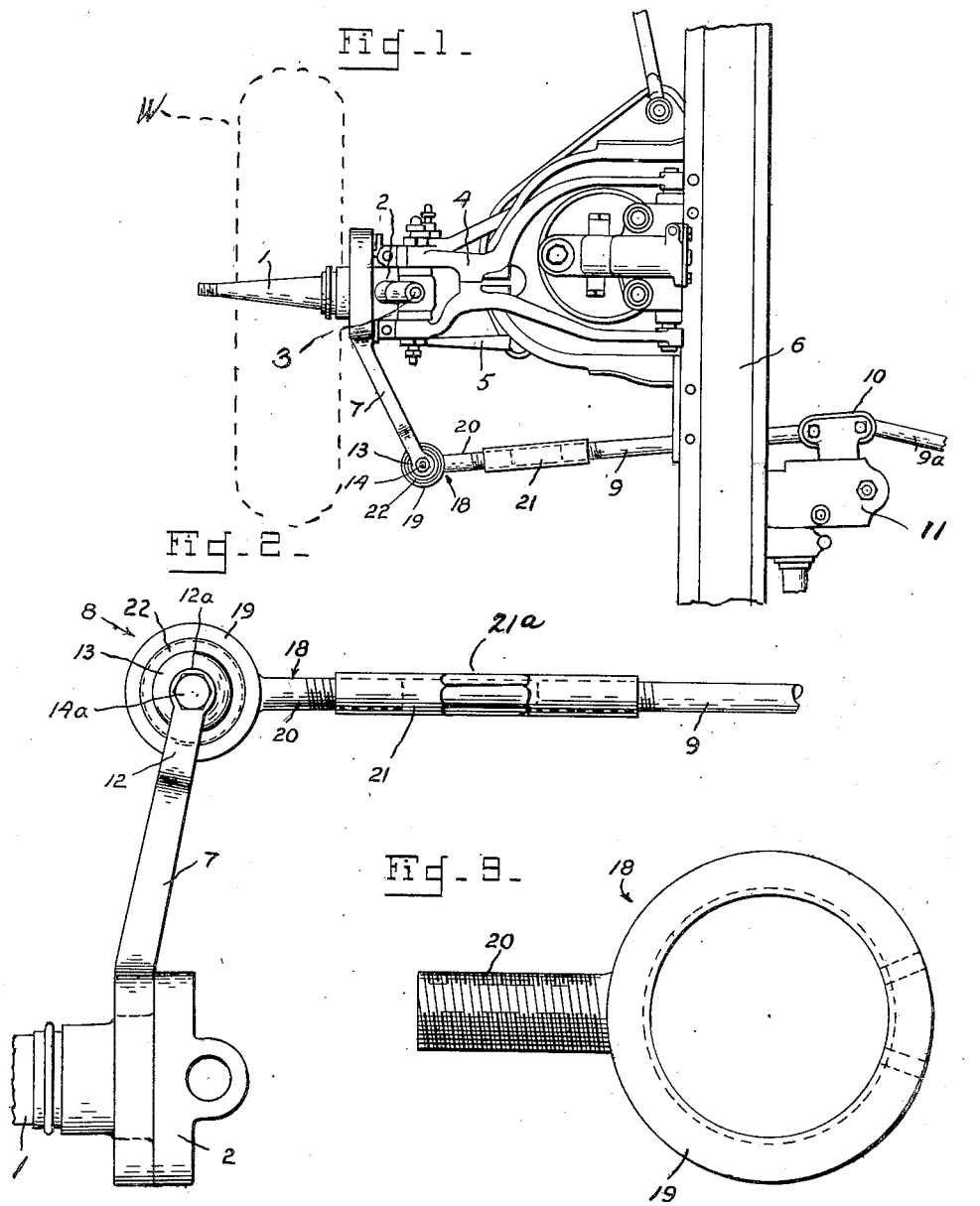
Inventor
Allen L. Jeffus
By [signature]
Attorney

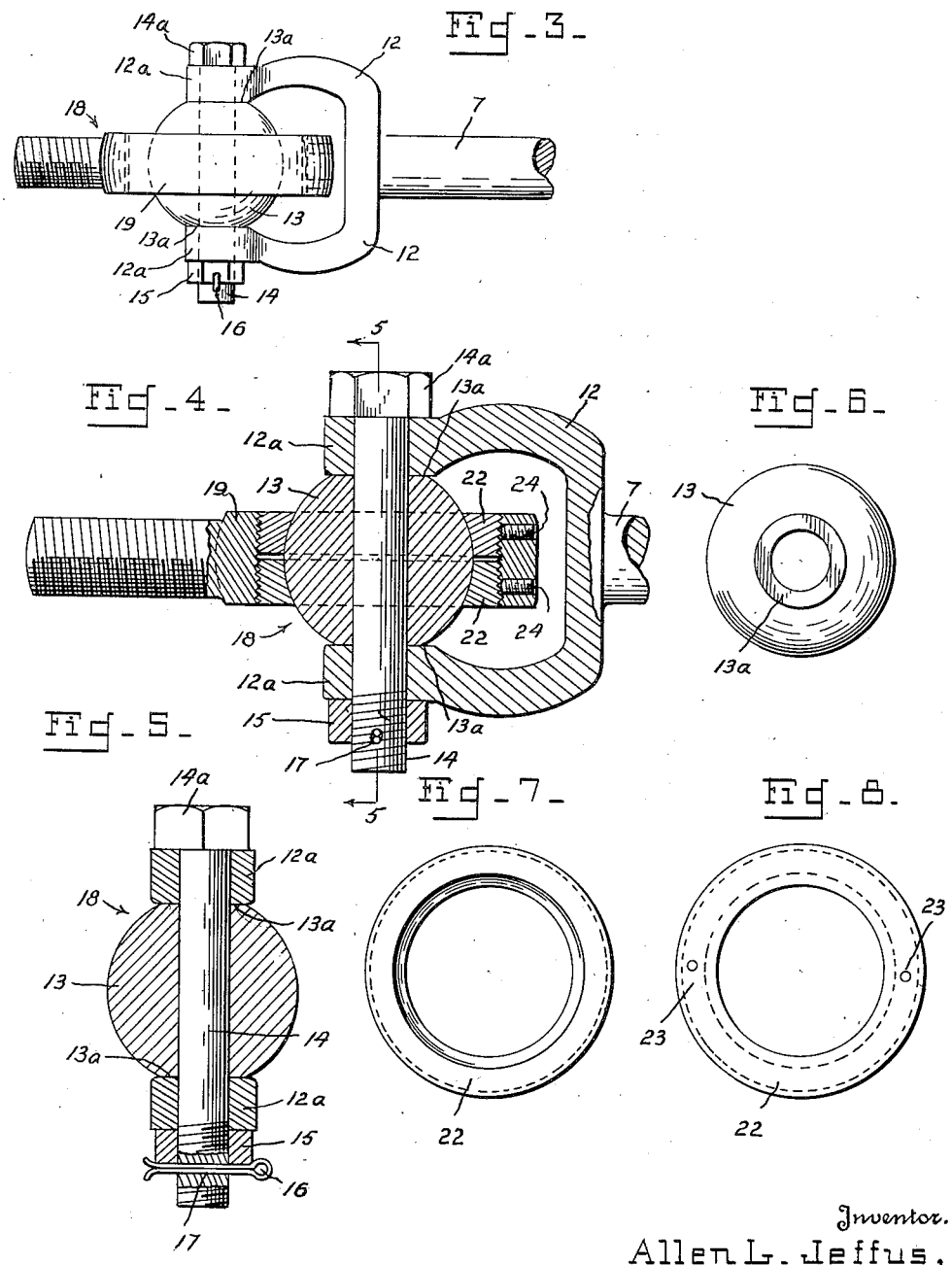

Patented May 1, 1951

2,551,437

UNITED STATES PATENT OFFICE 2,551,437

TIE-ROD CONNECTION FOR VEHICLE STEERING MECHANISMS

Allen L. Jeffus, Oberlin, Kans.

Application June 8, 1948, Serial No. 31,723

2 Claims. (Cl. 287—88)

This invention relates to steering mechanisms for vehicles, such as automobiles, in which the two front wheels of the vehicle are independently suspended and the forces for turning the wheels to guide the vehicle are transmitted from tie-rods pivotally connected with the steering gear to arms associated with the steering knuckles on which the wheels are mounted.

An important object of the invention is to provide a more flexible connection between the tie-rods and steering arms so as to insure smoother and easier control of the vehicle on turns and on rough roads where the wheels flex at varying rates and to different extents.

Another object of my invention is to provide a tie-rod connection of the above character which provides an enlarged bearing surface between the relatively movable parts and which may be easily adjusted to compensate for wear.

Still another object of my invention is to provide a tie-rod connection of the above character which is readily adjustable to vary the toe-in angle of the front wheels.

Other objects and advantages will be apparent from the following detailed description of a preferred embodiment of the invention in which:

Figure 1 is a plan view of an independent suspension for one of the front wheels of an automobile;

Figure 2 is an enlarged plan view showing an improved connection between the tie-rod and the steering knuckle arm;

Figure 3 is a view of the tie-rod connection taken at right angles to Figure 1;

Figure 4 is an enlarged cross-sectional view through the tie-rod connection of Figure 2;

Figure 5 is a cross-sectional view through the ball-supporting yoke of the tie-rod connection taken on the lines 5—5 of Figure 4, the tie-rod itself being omitted for greater clearness;

Figure 6 is a top plan view of the ball member of Figure 5;

Figure 7 is a bottom plan view of one of the two bushings which together form the socket for the ball of the tie-rod connection;

Figure 8 is a top plan view of the bushing of Figure 7; and

Figure 9 is a plan view of the outer end section of the tie-rod in which a paired assembly of the bushings of Figures 7 and 8 are supported.

In Figure 1 of the drawing is shown a front wheel suspension of a common type that is employed on automobiles. This wheel suspension comprises generally a stub axle 1 upon which a wheel W (indicated in broken lines) is supported. The stub axle forms part of a steering knuckle 2 mounted for turning movement about a king bolt 3 and supported for up-and-down movement upon upper and lower link structures 4 and 5 extending between the knuckle 2 and the chassis frame 6 of the vehicle. Spring means (not shown) are provided for absorbing upward road thrusts upon the wheel when the vehicle is in motion.

It is unnecessary to describe the wheel suspension in greater detail since it may take various forms and is intended only to show the location and relationship of the parts of the steering mechanism with which the present invention is concerned. For transmitting forces from the steering wheel located at the driver's seat to turn the vehicle wheel, a steering arm 7 associated with or forming part of the steering knuckle has a pivoted connection 8 with the outer end of a tie-rod 9. The other end of this tie-rod is pivotally connected to a pitman arm 10 projecting from a steering gear box 11 mounted on the chassis 6 of the vehicle. A tie-rod 9a, corresponding to the tie-rod 9, leads from the pitman arm 10 to the opposite side of the vehicle and the construction of the suspension for the right-hand front wheel is the same in all essential respects as that just described for the left front wheel suspension. Turning movement is thus imparted to the vehicle wheels under the control of the driver seated in the car at the steering wheel.

The structure just described is more or less conventional for automobile front wheel suspensions at the present time and no invention is claimed therefor apart from the construction about to be described.

The outer end of the steering arm 7 is fashioned in the form of a yoke 12 (see Figs. 3 and 4) and located in this yoke is a ball 13 having flattened ends (as indicated at 13a) which are snugly received between the arms 12a of the yoke. The two arms of the yoke and the ball are provided with registering openings in which is received a vertically disposed machine bolt 14, the head 14a of which overlies the upper arm of the yoke while its lower end projects downwardly below the lower arm and is threaded to receive a nut 15. A cotter pin 16 passing through a transverse opening 17 in the bolt below the nut locks the nut in place.

The outer end of each of the tie rods 9 and 9a is provided with an end section 18 comprising a cylindrical ring 19 and a stem 20 integral with and leading radially off from the ring, as best shown in Figure 9. The stem is circumferentially threaded and screws into one end of a sleeve 21 while the adjacent end of the tie-rod 9 is also threaded and screws into the opposite end of the sleeve. Thus, the sleeve makes a rigid and adjustable joint so that by turning the sleeve 21 the ends of the tie-rod and end section are axially drawn together (or, alternatively, spread apart) in the same manner as a turnbuckle.

The internal diameter of the ring 19 is sufficiently oversize relative to the ball 13 to receive therein a pair of bushings 22 surrounding the ball, as best shown in Figures 4, 7 and 8. The bushings are circumferentially threaded to engage threads upon the inside of the ring and the outer face of each bushing is provided with holes 23 for engagement by a spanner wrench by means of which the bushings may be independently adjusted toward and from each other within the ring. Set screws 24 threaded within transverse openings in the ring engage the bushings and hold them against turning, such as might occur due to vibration of the vehicle. The inner circumferences of the bushings are concavely formed so as to snugly engage spheroidal surfaces on the ball above and below its great circle, as best indicated in Figure 4, thus together providing a socket for the ball.

By reason of the construction just described, the ball-and-socket connection between the tie-rod and the steering arm affords universal movement between these two parts which is desirable in order to prevent the transmission of road shocks and vibration through the tie-rods to the steering gear; while the large bearing area between the ball 13 and the bushings 22 reduces wear and when such wear does occur, it may be readily taken up simply by screwing the bushings into closer engagement with the ball.

To adjust the toe-in angle of the wheels, the sleeve 21 is rotated by engagement of the flattened portion 21a with a wrench to screw the end section of the tie-rod axially inwardly or outwardly. This determines the angular relationship of the stub axle with reference to the longitudinal axis of the vehicle, and hence the degree of toe-in of the wheels.

The steering mechanism for independently suspended wheels set forth above is simply illustrative, and manifestly the tie-rod connection of my invention may be applied to other forms of steering mechanisms in which a tie-rod serves to transmit thrusts to a steering knuckle through an arm connected either directly or indirectly with the steering knuckle. It is also immaterial whether the ball is supported on the tie-rod and the yoke is supported on the steering arm (as described herein) or vice versa. A lubrication fitting may be provided on the ring 19 for lubricating the ball-and-socket connection; and a rubber shield is desirably associated with the tie-rod connection to prevent access of dust and dirt thereto. Such features are largely conventional and consequently have not been illustrated on the drawings.

While a preferred specific embodiment of the tie-rod connection of the invention has been described above, it is to be understood that the invention is not limited to the exact structure illustrated and described but modifications of details and design may be made without departing from the spirit of the invention as set forth in the following claims.

I claim:

1. In an automobile steering mechanism having a steering knuckle provided with an arm extending at an angle to the axis of the knuckle, the outer end of the arm being formed with a yoke, a ball straddled by the yoke and formed with a diametrical bore therethrough and flattened at the extremities of the bore, a bolt extending through the bore and the extremities of the yoke to secure the ball in the yoke, a tie-rod formed with a terminal ring disposed in surrounding relation to the ball, the interior diameter of said ring being materially in excess of the diameter of the ball, and complemental bearing rings axially adjustable in said terminal ring and having interior spherical bearing faces engaging the surface of the ball on opposite sides of a great circle.

2. In an automobile steering mechanism having a steering knuckle provided with an arm extending at an angle to the axis of the knuckle, the outer end of the arm being formed with a yoke, a ball straddled by the yoke and formed with a diametrical bore therethrough and flattened at the extremities of the bore, a bolt extending through the bore and the extremities of the yoke to secure the ball in the yoke, a tie-rod formed with an interiorly threaded terminal ring disposed in surrounding relation to the ball, the interior diameter of said ring being materially in excess of that of the ball, complemental bearing rings exteriorly threaded to engage the interior threads in the terminal ring, the bearing rings having spherical inner faces to bear superficially on the ball on opposite sides of a great circle, and set-screws threaded radially through the terminal ring and bearing one on each of the bearing rings to maintain the adjustment of the latter.

ALLEN L. JEFFUS.

REFERENCES CITED

The following references are of record in the file of this patent:

UNITED STATES PATENTS

| Number | Name | Date |
|---|---|---|
| 1,734,244 | Bingman | Nov. 5, 1929 |
| 2,049,502 | Hufferd et al. | Aug. 4, 1936 |
| 2,365,552 | Hill | Dec. 19, 1944 |
| 2,383,378 | Flumerfelt | Aug. 21, 1945 |
| 2,405,148 | Keahey | Aug. 6, 1946 |

FOREIGN PATENTS

| Number | Country | Date |
|---|---|---|
| 108,119 | Great Britain | July 26, 1917 |
| 235,820 | Great Britain | June 24, 1925 |